(12) United States Patent
Glaab

(10) Patent No.: US 6,597,789 B1
(45) Date of Patent: Jul. 22, 2003

(54) VIDEO/AUDIO SCRAMBLING WITH SINGLE CONVERSION TUNERS

(75) Inventor: Joseph B. Glaab, New Hope, PA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 09/213,426

(22) Filed: Dec. 17, 1998

(51) Int. Cl.$^7$ ............................................. H04N 7/167
(52) U.S. Cl. ................... 380/220; 380/210; 380/236; 380/237; 380/238; 725/27
(58) Field of Search .................. 380/31–32, 210, 380/220, 236–238; 725/27

(56) References Cited

U.S. PATENT DOCUMENTS

| | | | |
|---|---|---|---|
| 3,826,863 A | * 7/1974 | Johnson | 380/220 |
| 3,886,550 A | * 5/1975 | Gilleran et al. | 342/201 |
| 3,914,534 A | * 10/1975 | Forbes | 251/175 |
| 4,081,831 A | * 3/1978 | Tang et al. | 380/220 |
| 4,286,288 A | * 8/1981 | Waldo | 380/220 |
| 4,535,355 A | * 8/1985 | Arn et al. | 380/212 |
| 5,483,277 A | * 1/1996 | Granger | 725/120 |
| 6,057,876 A | * 5/2000 | Waight | 725/151 |

OTHER PUBLICATIONS

Frederick E. Terman/Electronic and Radio Engineering/1955/McGraw–Hill Book Company Inc./Fourth Edition/pp. 568–570.*

* cited by examiner

Primary Examiner—Gilberto Barrón
Assistant Examiner—Kambiz Zand
(74) Attorney, Agent, or Firm—Steven L. Nichols; Ronald P. Kananen; Rader, Fishman & Grauer PLLC

(57) ABSTRACT

Conventional decoding systems for scrambled audio-visual signals are improved by providing a dual-side local oscillator that functions as a high-side oscillator if the incoming RF signal is unscrambled and as a low-side oscillator if the incoming RF signal is scrambled. The result is that the unscrambled signal is reversed from an audio-over-video transmission configuration to an IF signal with a video-over-audio configuration, and a scrambled signal is maintained in a video-over-audio configuration, the video-over-audio configuration being the configuration required for proper reception and use of the signal by a television set. To function as both a high- and low-side oscillator, the dual-side oscillator has independent voltage control and does not follow the tracking filter associated with the tuner.

22 Claims, 2 Drawing Sheets

VIDEO/AUDIO SCRAMBLING WITH SINGLE CONVERSION TUNERS

FIELD OF THE INVENTION

The present invention relates to the field of audio-visual signal transmission and reception. More particularly, the present invention relates to a method and apparatus for scrambling an audio-visual signal during transmission in order to control reception and use of the signal.

BACKGROUND OF THE INVENTION

Cable and pay-per-view television programming are extremely popular and widely available in modern society. Those firms providing such programming are frequently lucrative and successful. This success comes from the ability to prevent those who have not purchased the service from receiving and using the audio-visual signals transmitted by the service provider.

In general, it is common for a cable company or other service provider to scramble its signals to prevent their use by unauthorized parties. This scrambling is intended to make the signals unintelligible to typical television sets which are not authorized to receive and use the scrambled signal. When the signal is scrambled, a conventional television will not recognize the signal, or at best, display a distorted image from the signal.

Cable companies which provide a number of channels over a cable connection may only scramble certain channels so that cable subscribers can be required to pay additional fees for receiving these "premium" channels. The premium channels are typically movie or adult channels.

Those subscribers who have paid the service provider for reception of the scrambled signal will be given equipment for use with their television sets which unscrambles the signal. With this equipment, the authorized user can unscramble and receive the service provider's signals and view the programming contained in the transmission.

A well-known conventional method of scrambling a signal to prevent its unauthorized reception is to reverse the spectral positions of the audio and video portions of the signal. Typically, an audio-visual signal will have an audio carrier signal at a first frequency and a video carrier signal at a second frequency. The carrier signals are modulated to carry the respective video and audio data of the transmitted programming.

If, however, the audio carrier signal is transmitted at the second (video carrier) frequency, and the video carrier signal is transmitted at the first (audio carrier) frequency, the signal is scrambled. A television tuner will be attempting to receive the audio signal at the first frequency and the video signal at the second frequency, and will be unable to receive the reversed signal properly.

This method of scrambling an audio-visual signal is not wholly satisfactory, however, for the following reasons. The 4.5 Mhz audio beat may still be received by the unauthorized television. Then, if the television set is fine tuned, it may be possible to receive the picture portion of the signal. The picture will most likely be stripped of its color information and appear in black and white, but the unauthorized user may in this way obtain limited use of the scrambled signal. If the picture signal contains adult programming, even this limited visibility may be a problem under federal regulation.

Accordingly, there is a need in the art for a low-cost, but more effective means and method of scrambling an audio-visual signal.

SUMMARY OF THE INVENTION

It is an object of the present invention to meet the above-described needs and others. Specifically, it is an object of the present invention to provide a method and device for scrambling an audio-visual signal and for receiving the scrambled signal that is both effective and inexpensive.

Additional objects, advantages and novel features of the invention will be set forth in the description which follows or may be learned by those skilled in the art through reading these materials or practicing the invention. The objects and advantages of the invention may be achieved through the means recited in the attached claims.

To achieve these stated and other objects, the present invention may be embodied as an audio-visual signal reception system for receiving both scrambled and unscrambled signals which includes: a tuner for receiving an incoming signal that may or may not be scrambled; a dual-side local oscillator providing an oscillations signal in response to whether the incoming signal is scrambled or unscrambled; and a mixer for receiving the incoming signal and the oscillation signal and outputting an intermediate frequency signal.

If the incoming signal is scrambled, the dual-side oscillator functions as a low-side oscillator and provides the oscillation signal at a frequency lower than a frequency of the incoming signal. The mixer then subtracts the oscillation signal from the incoming signal to produce the intermediate frequency signal.

If the incoming signal is unscrambled, the dual-side oscillator functions as a high-side oscillator and provides the oscillation signal at a frequency higher than a frequency of the incoming signal. The mixer then subtracts the incoming signal from the oscillation signal to produce the intermediate frequency signal.

The voltage supplied to the dual-side local oscillator is provided and regulated by an independent voltage controller. The voltage input to the oscillator is determined in response to whether the incoming signal is scrambled or unscrambled.

After the intermediate frequency signal is produced, an intermediate frequency signal to baseband signal processor converts the intermediate frequency signal to a baseband signal. The baseband signal can then be displayed by the television set.

The present invention also encompasses a method of receiving scrambled audio-visual signals. The method includes the steps of: receiving an incoming signal (which may be scrambled or unscrambled) with a tuner; providing an oscillation signal with a dual-side local oscillator in response to whether the incoming signal is scrambled or unscrambled; and mixing the incoming signal and the oscillation signal with a mixer and outputting a resulting intermediate frequency signal.

If the incoming signal is scrambled, the method proceeds by (1) providing, with the dual-side oscillator, the oscillation signal at a frequency lower than the frequency of the incoming signal, and (2) subtracting, with the mixer, the oscillation signal from the incoming signal to produce the intermediate frequency signal.

If the incoming signal is unscrambled, the method proceeds by (1) providing, with the dual-side oscillator, the oscillation signal at a frequency higher than the frequency of the incoming signal, and (2) subtracting, with the mixer, the incoming signal from the oscillation signal to produce the intermediate frequency signal.

Preferably, the method of the present invention also includes independently controlling the voltage input to the dual-side oscillator with an independent voltage controller in response to whether the incoming signal is scrambled or unscrambled. Finally, the method may include converting the intermediate frequency signal to a baseband signal.

BRIEF DESCRIPTION OF THE DRAWINGS

The accompanying drawings illustrate the present invention and are a part of the specification. Together with the following description, the drawings demonstrate and explain the principles of the present invention.

DETAILED DESCRIPTION OF THE PREFERRED EMBODIMENTS

Using the drawings, the preferred embodiments of the present invention will now be explained.

Figure 1:
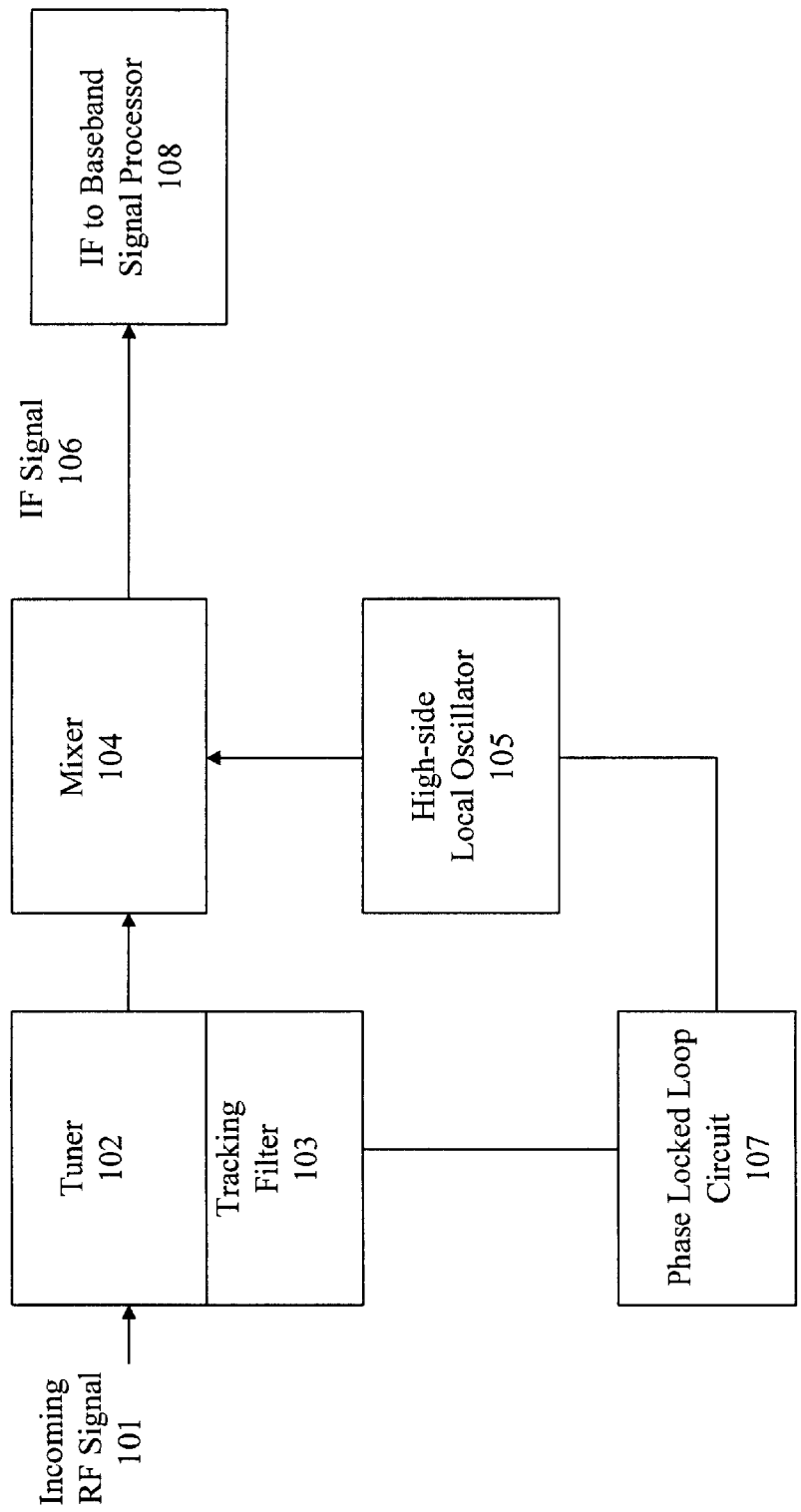
FIG. 1 is block diagram showing a conventional audio-visual signal reception system.

FIG. 1 illustrates a block diagram of a conventional signal reception system of a television. The television has a tuner 102. By adjusting the voltage input to the tuner, the viewer can change the channel being received by the television. The voltage applied to the tuner is controlled by a tracking filter 103.

The signal received by the tuner 102 is a radio frequency (RF) signal. Before the signal can be used and displayed by the television set, it must be converted to a baseband signal. This is done by first converting the RF signal to an intermediate frequency (IF) signal 106, which is in turn converted to the required baseband signal.

The RF signal 101 is converted into an IF signal 106 by mixing the RF signal with a local oscillation signal from a local oscillator 105. This mixing is accomplished by the mixer 104. The local oscillator 105 is a high-side oscillator, meaning that the mixer subtracts the value of incoming RF signal from the value of the oscillation signal to obtain the IF signal 106.

By way of an example, an RF signal for a particular channel may have a video carrier frequency at 100 MHz and an audio carrier frequency at 106 MHz, i.e. the audio carrier is "over" the video carrier. In such an instance, the local oscillator 105 would output an oscillation signal centered at a frequency of 140 MHz.

The mixer 104 then subtracts the RF signal from the oscillation signal. The result is an IF signal with an audio carrier frequency at 34 MHz (140 MHz–106 MHz) and a video carrier frequency at 40 MHz (140 MHz–100 MHz). Note that the carrier frequencies are now inverted, i.e. the video carrier is over the audio carrier. This is the format in which the processor 108 will expect to find the respective carrier frequencies for conversion from IF to baseband.

As shown in FIG. 1, the tracking filter 103 and the local oscillator 105 are connected through a phase locked loop circuit 107. In this way, the local oscillator 105, and hence the local oscillator frequency, are controlled by the tracking filter 103 with respect to the channel to which the tuner 102 is tuned.

Now, if the channel to which the tuner 102 is tuned is a premium channel, the incoming RF signal may be scrambled, i.e. the audio carrier frequency is below the video carrier frequency. The signal processing proceeds as before. However, when the mixer 104 subtracts the RF signal from the oscillation signal, the audio and video carriers are reversed with respect to each other.

Using the previous example, the scrambled RF signal will have a video carrier signal at 106 MHz and an audio carrier signal at 100 MHz. When the mixer subtracts these values from the 140 MHz oscillation signal, the result is an IF signal with a video carrier frequency at 34 MHz (140 MHz–106 MHz) and an audio carrier frequency at 40 MHz (140 MHz–100 MHz).

In other words, the resulting IF signal 106 has the audio carrier frequency over the video carrier frequency. Because the subsequent IF to baseband processor 108 is configured for an IF signal with the video carrier frequency over the audio carrier frequency, the processor 108 will be unable to use the reversed IF signal 106 output by the mixer 104.

In the example of a cable television system, some users will pay an additional fee to receive the premium, scrambled channels. Thus, it is necessary to provide a way for these premium subscribers to receive both the unscrambled and scrambled channels.

In the past, this has required that an additional component be added to the system of FIG. 1 to reverse the relative positions of the video and audio carrier frequencies with respect to the scrambled, premium channel signals only. This additional component, sometimes called a descrambler, can be costly, but is a reasonably effective means of preventing unauthorized reception of premium signals.

Figure 2:
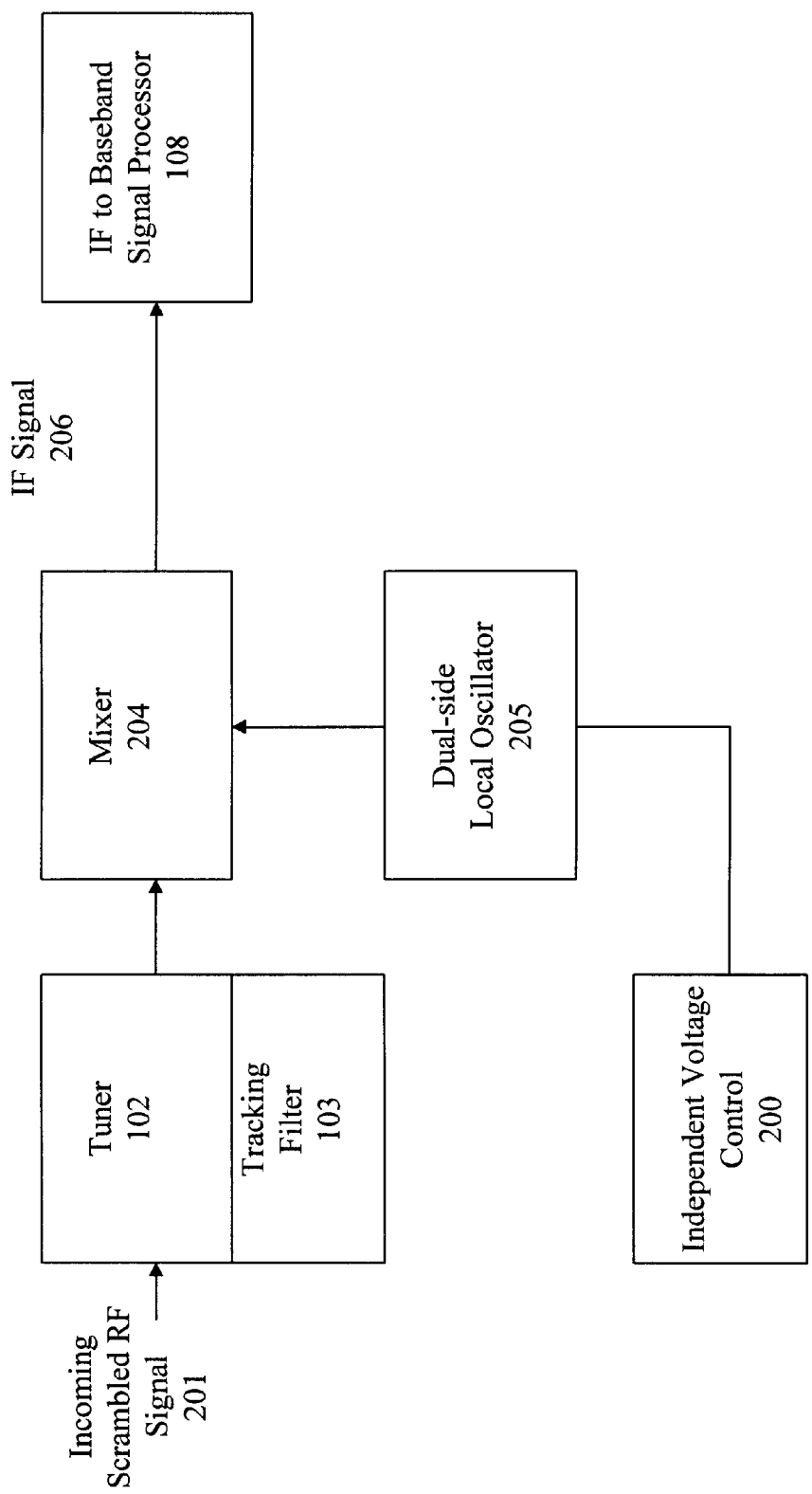
FIG. 2 is a block diagram showing an audio-visual signal reception system according to the present invention.

The present invention, however, offers a more elegant solution. As illustrated in FIG. 2, the high-side local oscillator 105 is replaced with a dual-side local oscillator 205 which can function as either a high or low side local oscillator. As before, a high-side local oscillator provides an oscillation signal from which the incoming RF signal is subtracted. A low-side local oscillator provides an oscillation signal which is subtracted from the incoming RF signal. The dual-side local oscillator 205 of the present invention can function as either a low- or high-side local oscillator depending on whether or not the RF signal for the channel being received is scrambled.

The dual-side oscillator 205 of the present invention is made possible by removing the electronic link between the oscillator 205 and the tracking filter 103 so that the voltage to the local oscillator 205 is independently controlled by an independent controller 200. The independent controller 200 may operate, for example, by having a look-up table which specifies the voltage to be supplied to the local oscillator 205 depending on the channel to which the tuner 102 and tracking filter 103 are being tuned.

Extending the earlier example, if the incoming signal is not scrambled, the dual-side local oscillator 205 will function as a high-side local oscillator and the operation of the system in FIG. 2 will parallel the operation of the system in FIG. 1, and the unscrambled signal will be received normally.

However, if the incoming RF signal 201 is scrambled, i.e. the video and audio carrier frequencies are reversed, the local oscillator 205 will function as a low-side oscillator. Using the previous example, a scrambled signal may have the audio carrier frequency 100 MHz while the video carrier frequency is 106 MHz. The dual-side local oscillator 205 then functions as a low-side oscillator and provides an oscillation signal to the mixer 204 that is centered at 66 MHz.

The mixer 204 subtracts the oscillation signal from the incoming scrambled RF signal 201. The result is an IF signal 206 with a video carrier frequency of 40 MHz (106 MHz–66

MHz) and an audio carrier frequency of 34 MHz (100 MHz–66 MHz). This resulting IF signal 206 has a video carrier frequency over the audio carrier frequency. This configuration will be properly recognized and interpreted by the subsequent IF to baseband signal processor 108.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. An audio-visual signal reception system for receiving both scrambled and unscrambled signals, the system comprising:
   a tuner for receiving an incoming signal, wherein said incoming signal may be scrambled or unscrambled;
   a dual-side local oscillator providing an oscillation signal based on whether said incoming signal is predetermined to be scrambled or unscrambled;
   a mixer for receiving the incoming signal and the oscillation signal and outputting an intermediate frequency signal; and
   an independent voltage controller for controlling a voltage input to said dual-side oscillator based on whether said incoming signal is predetermined to be scrambled or unscrambled, wherein said independent voltage controller references a look-up table which specifies said voltage to be input to said dual-side oscillator depending on a channel to which said tuner is tuned.

2. A system as claimed in claim 1, wherein if said incoming signal is scrambled, said dual-side oscillator provides said oscillation signal at a frequency lower than a frequency of said incoming signal.

3. A system as claimed in claim 2, wherein said mixer subtracts said oscillation signal from said incoming signal to produce said intermediate frequency signal.

4. A system as claimed in claim 1, wherein if said incoming signal is unscrambled, said dual-side oscillator provides said oscillation signal at a frequency higher than a frequency of said incoming signal.

5. A system as claimed in claim 4, wherein said mixer subtracts said incoming signal from said oscillation signal to produce said intermediate frequency signal.

6. A system as claimed in claim 1, further comprising an intermediate frequency signal to baseband signal processor for converting said intermediate frequency signal to a baseband signal.

7. A method of receiving audio-visual signals for receiving both scrambled and unscrambled signals, the method comprising:
   receiving an incoming signal with a tuner, wherein the incoming signal may be scrambled or unscrambled;
   providing an oscillation signal with a dual-side local oscillator based on whether said incoming signal is predetermined to be scrambled or unscrambled;
   mixing the incoming signal and the oscillation signal with a mixer and outputting an intermediate frequency signal; and
   controlling a voltage input to said dual-side oscillator based on whether said incoming signal is predetermined to be scrambled or unscrambled by referencing a look-up table which specifies said voltage to be input to said dual-side oscillator depending on a channel to which said tuner is tuned.

8. A method as claimed in claim 7, wherein if said incoming signal is scrambled, said method further comprises providing, with said dual-side oscillator, said oscillation signal at a frequency lower than a frequency of said incoming signal.

9. A method as claimed in claim 8, further comprising subtracting, with said mixer, said oscillation signal from said incoming signal to produce said intermediate frequency signal.

10. A method as claimed in claim 7, wherein if said incoming signal is unscrambled, said method further comprises providing, with said dual-side oscillator, said oscillation signal at a frequency higher than a frequency of said incoming signal.

11. A method as claimed in claim 10, further comprising subtracting, with said mixer, said incoming signal from said oscillation signal to produce said intermediate frequency signal.

12. A method as claimed in claim 7, further comprising converting said intermediate frequency signal to a baseband signal.

13. A system as claimed in claim 1, wherein said oscillation signal has a first attribute when said incoming signal is said unscrambled signal, and has a second attribute different than said first attribute when said incoming signal is said scrambled signal.

14. A system as claimed in claim 13, wherein said first attribute is a first oscillation frequency, and said second attribute is a second oscillation frequency.

15. A method as claimed in claim 7, wherein said oscillation signal has a first attribute when said incoming signal is said unscrambled signal, and has a second attribute different than said first attribute when said incoming signal is said scrambled signal.

16. A method as claimed in claim 15, wherein said first attribute is a first oscillation frequency, and said second attribute is a second oscillation frequency.

17. A system for receiving audio-visual signals, both scrambled and unscrambled signals, the system comprising:
   tuner means for receiving and tuning an incoming signal, wherein the incoming signal may be scrambled or unscrambled;
   oscillation means for providing an oscillation signal based on whether said incoming signal is predetermined to be scrambled or unscrambled;
   means for mixing the incoming signal and the oscillation signal and outputting an intermediate frequency signal; and
   means for controlling said oscillation means based on whether said incoming signal is predetermined to be scrambled or unscrambled, including means for referencing a look-up table which specifies a voltage to be input to said oscillation means depending on a channel to which said tuner means is tuned.

18. A system as claimed in claim 17, wherein if said incoming signal is scrambled, said oscillation means provides said oscillation signal at a frequency lower than a frequency of said incoming signal.

19. A system as claimed in claim 18, further comprising means for subtracting said oscillation signal from said incoming signal to produce said intermediate frequency signal.

20. A system as claimed in claim 17, wherein if said incoming signal is unscrambled, said oscillation means provides said oscillation signal at a frequency higher than a frequency of said incoming signal.

21. A system as claimed in claim 20, further comprising means for subtracting said incoming signal from said oscillation signal to produce said intermediate frequency signal.

22. A system as claimed in claim 17, further comprising means for converting said intermediate frequency signal to a baseband signal.

\* \* \* \* \*